United States Patent [19]

Langlais et al.

[11] 4,344,496

[45] Aug. 17, 1982

[54] INTEGRAL PARALLELOGRAM LOAD RECEIVER

[75] Inventors: Jacques F. Langlais, Coudray Monteraux; Jean-Claude Valadier, Paris, both of France

[73] Assignee: Testut-Aequitas, Paris, France

[21] Appl. No.: 206,387

[22] Filed: Nov. 13, 1980

[30] Foreign Application Priority Data

Nov. 16, 1979 [FR] France .................................. 79 28300

[51] Int. Cl.³ .......................... G01G 3/14; G01G 3/08; G01L 5/12
[52] U.S. Cl. .................................... 177/211; 177/229; 177/210 C; 73/862.65
[58] Field of Search ................... 177/210 C, 211, 229; 73/862.65

[56] References Cited

U.S. PATENT DOCUMENTS

| 3,180,139 | 4/1965 | Soderholm | 73/862.65 |
| 4,065,962 | 1/1978 | Shoberg | 73/862.65 |
| 4,143,727 | 3/1979 | Jacobson | 177/229 X |
| 4,285,413 | 8/1981 | Dauge et al. | 177/210 C |

Primary Examiner—George H. Miller, Jr.
Attorney, Agent, or Firm—Dressler, Goldsmith, Shore, Sutker & Milnamow, Ltd.

[57] ABSTRACT

The present invention relates to a load receiver. This load receiver comprises a fixed upright integral with a frame, a loaded upright integral with a load-carrying plate and two arms hinged on the uprights to form therewith a deformable parallelogram, and two uprights and the two arms together forming an integral structure, provided with constrictions which define the hinges of the deformable parallelogram, and a load transducer provided to detect the deformation of the parallelogram under the effect of a load applied on the plate. The load receiver is of use notably for commercial balances.

9 Claims, 4 Drawing Figures

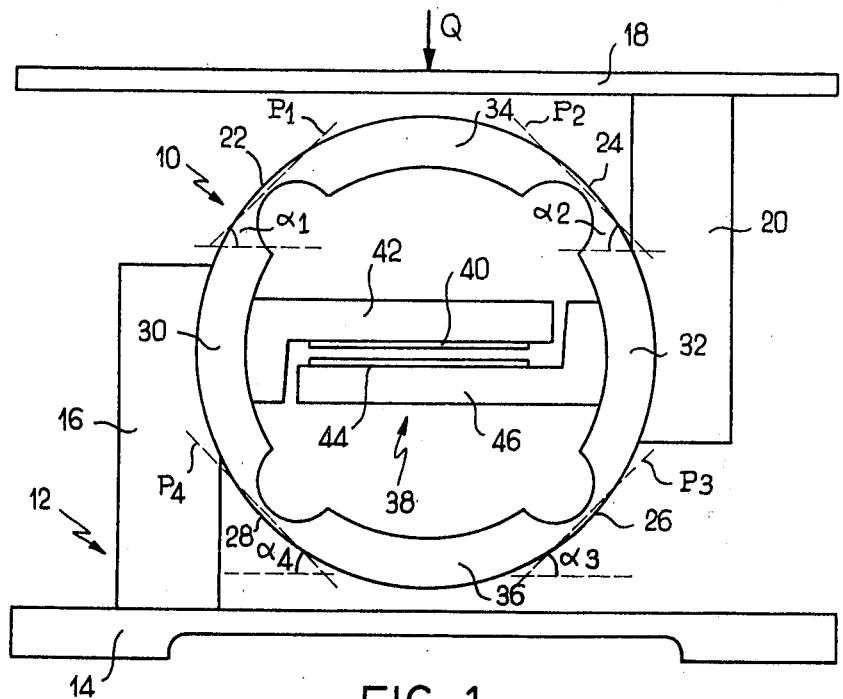
FIG_1
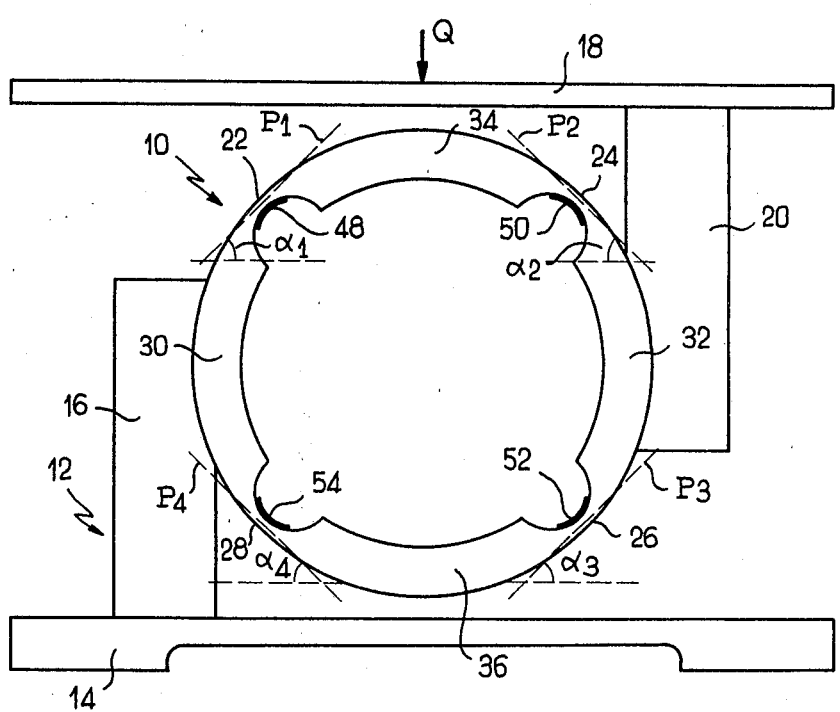
FIG_2

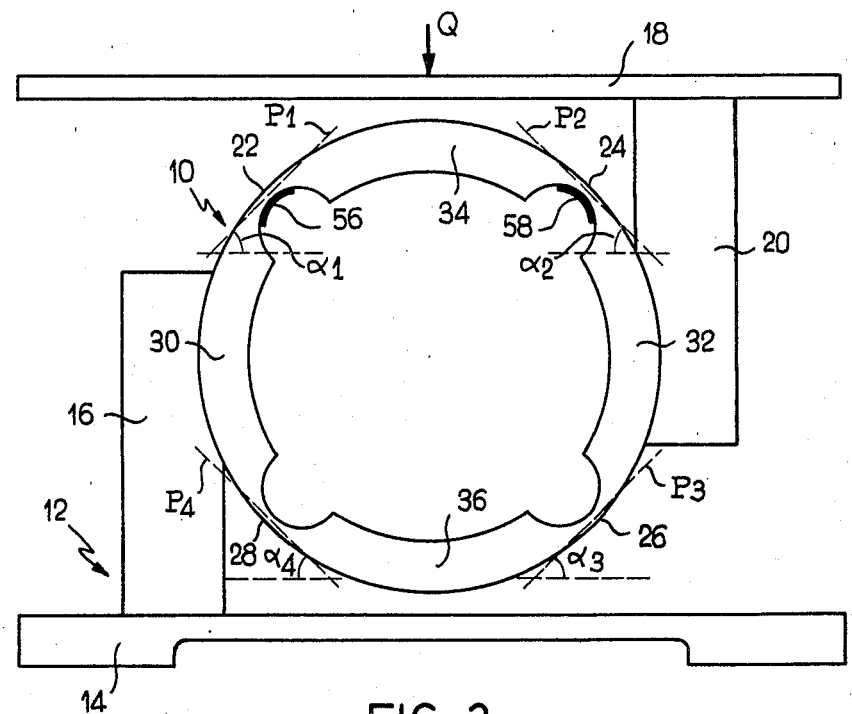
FIG_3
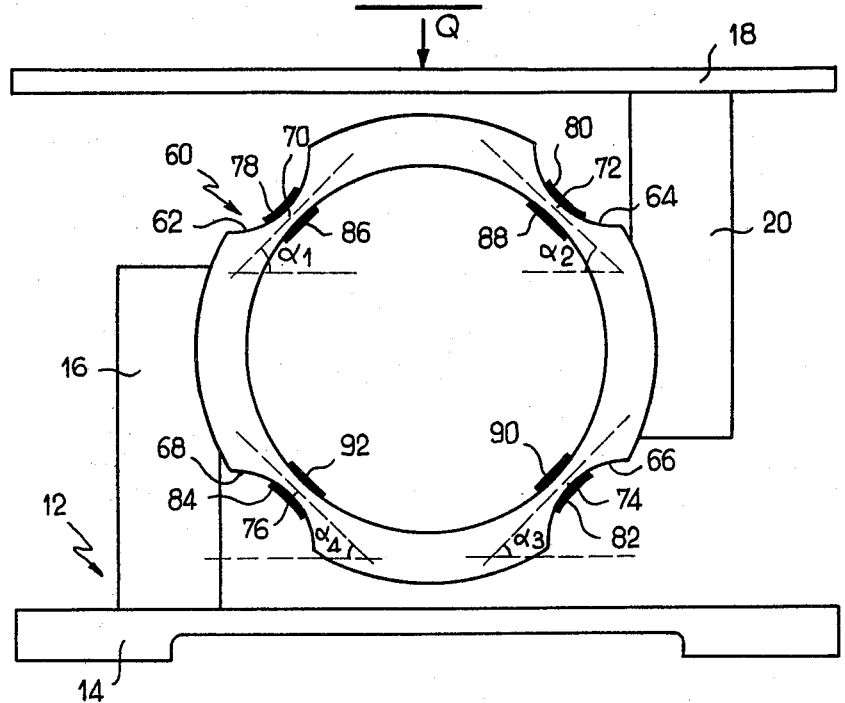
FIG_4

INTEGRAL PARALLELOGRAM LOAD RECEIVER

This invention relates to a load receiver which may be used notably in balances for commercial use.

Load receivers are already known in the prior art which comprise a fixed upright integral with a frame, a loaded upright integral with a load-carrying plate, and two arms hinged on these uprights to form therewith a deformable parallelogram.

The simplest structure of this type is the Roberval balance and the structures which are derived therefrom. Although they are still used fairly frequently, these load receivers, which are of a purely mechanical design, are unsuitable for present trends which require balances with electronic measuring means and with a luminous numerical display.

In order to lessen this disadvantage, load receivers have been suggested in which the two uprights and the two arms together form an integral unit, the hinges being defined by constrictions in the constituent material, like an elastic hinge.

A load receiver of this type is described in French Patent Application No. 79 08218, filed on the 2nd April 1979 in the name of the Applicant.

The present invention relates to a load receiver of this type which is easier to produce and more compact so that is may be integrated more easily into one balance.

The load receiver according to the invention comprises a fixed upright integral with a frame, a loaded upright integral with a load-carrying plate and two arms hinged on the uprights to form therewith a deformable parallelogram, and in which the two uprights and the two arms together form an integral structure provided with constrictions which define the hinges of the deformable parallelogram, while a load transducer is provided to detect the deformation of the parallelogram under the effect of the load applied onto the plate.

According to the essential characteristic of the invention, at least one of the constrictions have in their flexion zone a neutral line, the slope of which is inclined to the horizontal. It is known how to define a neutral line or neutral fibre in a flexion organ, which line or fibre passes through the points of zero elongation. This neutral line may be used to define the behaviour of the constrictions considered as elastic hinges. Although the constrictions are often symmetrical and are generally defined by a circular contour, they may also be in any other form, even an asymmetrical form.

According to the invention, the slope of the neutral line of the constrictions is inclined to the horizontal by an angle $\alpha$ which may, for example, be between 30° and 60° and is preferably approximately 45°.

This particular characteristic allows an integral structure to be produced, delimited axially by an internal profile and an external profile with parallel generatrices, one profile having a circular cross section.

This integral structure may therefore be advantageously produced from an extrusion, for example a tube.

In the case where the extrusion is a tube, the profile with a circular cross section of the integral structure will be constituted by the internal or external profile of the tube, for example the external profile.

According to another characteristic of the invention, the extrusion is composed of a material which has elastic qualities, such as spring steel, beryllium bronze or a light alloy.

The constrictions of the integral structure may be produced by interior and/or exterior machining of the extrusion or may be directly obtained by drawing out the extruded shape, depending on whether the constituent material of the extrusion adapts more easily to one or the other of these two techniques.

The load transducer advantageously comprises a capacitor transducer, formed by a first electrode mounted integrally with the fixed upright and by a second electrode mounted integrally with the loaded upright, the load therefore being effectively measured by electronic circuits, in which, for example, the ratio of the capacity of the capacitive load trnsducer, defined by the first and second electrodes, of the capacity of a reference capacitor is measured.

The load transducer may also comprise four strain gauges each positioned on a respective constriction or positioned in pairs on two constrictions having opposite strains, or eight strain gauges positioned in pairs respectively on the four constrictions.

Other characteristics and advantages of the invention will become evident when reading the detailed description which follows, with reference to the accompanying drawings which are only given as nonlimiting examples of different embodiments of the load receiver according to the invention:

FIG. 1 is a lateral, schematic view of a first embodiment of the invention, in which the integral structure has a circular external profile and in which the load transducer is a capacitor transducer;

FIG. 2 is a lateral, schematic view of a second embodiment of the invention, in which the integral structure has a circular, external profile and in which the load transducer comprises four strain gauges, each positioned on a respective constriction;

FIG. 3 is a lateral, schematic view of a third embodiment of the invention, in which the integral structure has a circular, external profile and in which the load transducer comprises four strain gauges positioned in pairs respectively on two constrictions having opposite strains; and FIG. 4 is a lateral, schematic view of a fourth embodiment of the invention, in which the integral structure has a circular internal profile and in which the load transducer comprises eight strain gauges positioned in pairs respectively on the four constrictions.

In FIGS. 1 to 4, the same elements are designated by the same reference numbers. FIGS. 1 to 3 show a balance, such as a commercial balance, comprising a load receiver designated as a whole by reference number 10, integral with a frame 12 composed of a base 14 and a vertical column 16, and a load-carrying plate 18, which is provided to support, at any point, a load designated by the letter Q. This plate is integrated with the parallelogram 10 by means of a column 20.

The deformable parallelogram 10 is composed of a circular ring-shaped structure obtained from an extrusion in the form of a circular tube and with four constrictions 22, 24, 26 and 28 in the constituent material of the tube and in the direction of the generatrices of this tube. These four constrictions constitute the hinges of a deformable parallelogram which has a fixed upright 30 integral with the frame 12, a loaded upright 32 integral with the plate 18 and two arms 34 and 36 hinged by their ends to the two uprights 30 and 32. The hinges defined by the constrictions 22, 24, 26 and 28 are elastic hinges, which have in their flexion zone a neutral line, the slope of which is inclined to the horizontal. Thus, the slopes P1, P2, P3 and P4 of the neutral lines of the hinges 22, 24, 26 and 28 have, respectively, an inclination of the horizontal of $\alpha1$, $\alpha2$, $\alpha3$ and $\alpha4$. In the example which is shown, the four angles $\alpha1$, $\alpha2$, $\alpha3$ and $\alpha4$ are all 45°, the hinged parallelogram having four equal sides.

However, this angle $\alpha$ may be modified and may vary, for example, between 30° and 60°.

This inclination of the slope of the neutral line of the elastic hinges allows, for a given strain, the scope of the balance to be increased and also allows an improved compactness of the load receiver to be obtained. The inclination may be selected to optimise the errors caused by the load Q being positioned eccentrically on the load-carrying plate.

The load receiver 10 may be produced from an extrusion in the form of a circular tube in which the constrictions will be produced by interior and/or exterior machining of the tube according to the generatrices of the tube. As a variation, the constrictions may be directly produced by extruding the tube, if the constituent material of the tube is suitable for extrusion of this type.

The extruded shape must be made of a material which has elastic qualities so that the parallelogram is deformed in a reversible manner when the load-carrying plate receives a load Q. This material may be, for example, spring steel, beryllium bronze or a light alloy such as dural.

The deformation of the parallelogram, under the effect of a load applied to the load-carrying plate is detected by a load transducer provided on the load receiver.

In the embodiment shown in FIG. 1, the load transducer is a capacitor transducer, designated as a whole by reference number 38. The transducer 38 comprises a first electrode 40 attached by means of an insulating member to a support 42 mounted integrally with the fixed upright 30 and a second electrode 44 attached by means of an insulating member to a support 46 mounted integrally with the loaded upright 32. The two electrodes 40 and 44 advantageously have surfaces which are elongated in the general direction of the arms 34 and 36. Therefore, it is preferred in order to avoid errors resulting from the electrodes being displaced laterally relative to each other as a function of the load, that the surface of one of the two electrodes is slightly larger than that of the other electrode so that the value of the capacity remains inversely proportional to the spacing of the two electrodes, which is itself proportional to the load carried on the load-carrying plate.

Therefore, when the load-carrying plate 18 is subjected to the effect of a weight Q, the spacing between the electrodes 40 and 44 and consequently the capacity of the capacitive load transducer, defined by these two electrodes, vary as a function of this weight.

The load is thus effectively measured by electronic circuits in which the ratio of the capacity of the capacitive load transducer, defined by the two electrodes, to the capacity of a reference capacitor is established.

Therefore, for this measurement it is preferable to use the means described in French Patent Application No. 77 28758, filed on Sept. 23, 1977 in the name of the Applicant.

The tests which we carried out have demonstrated that the measurements thus produced depend on the temperature for two reasons:

firstly, the modulus of elasticity or Young's modulus of the material supplying the elastic return varies as a function of the temperature, and secondly, the dimensions of the different elements of the load receiver, and notably of the supports of the electrodes as well as the surface of the electrodes themselves, vary as a function of the temperature. In order to compensate satisfactorily for the effects of a variation in temperature, we have observed tht the following course of action may be taken:

The reference capacitor is such that its supports are positioned so that the relative variation of the spacing of the electrodes, as a function of the temperature, is equal to the relative variation of the modulus of elasticity of the material which supplies the force of the elastic return. In order to produce such a compensation, action may be taken as described in French Patent Application No. 79 08218 in the name of Applicant, which has already been mentioned.

The balance shown in FIG. 2 also has the same overall structure as that which is shown in FIG. 1, except that the capacitor transducer has been replaced by a transducer comprising four strain gauges 48, 50, 52 and 54, positioned inside, on the constrictions 22, 24, 26 and 28, respectively. Therefore, when the load-carrying plate 18 receives a load Q, the constrictions 48 and 52 work under compression while the constrictions 50 and 54 work under traction, i.e. they have strains which are opposite those of the constrictions 48 and 52. As a variation, these four strain gauges could be positioned outside on the four constrictions.

Electrical connections (not shown) connect the gauges 48, 50, 52 and 54 to an electronic processing and display device which is able to display the value corresponding to the load Q applied on the load-carrying plate 18.

FIG. 3 represents an embodiment analogous to that of FIG. 2, but in which the four strain gauges are positioned in pairs inside on two constrictions having opposite strains. In the embodiment of FIG. 3, two strain gauges 56 are positioned on the constriction 22 and two strain gauges 58 are positioned on the constriction 24. These strain gauges are connected, as in the previous case, to an electronic processing and display device.

The balance shown in FIG. 4 again has substantially the same structure at that of FIGS. 1 to 3, except that the deformable parallelogram is composed of an integral structure 60, produced from an extrusion in the form of a tube, the internal profile of which has a circular cross section. The external profile has rounded edges 62, 64, 66 and 68 defining four constrictions 70, 72, 74 and 76, respectively. These constrictions each have, in their flexion zone, a neutral line, the slope of which is inclined by an angle $\alpha1$, $\alpha2$, $\alpha3$ and $\alpha4$, respectively, to the horizontal. In this embodiment, the load transducer is composed of eight strain gauges 78, 80, 82, 84, 86, 88, 90 and 92, positioned in pairs on the four constrictions 70, 72, 74 and 76, each pair having one gauge positioned on the inside of the constriction and one gauge positioned on the outside of the constriction.

Of course, in the embodiment of FIG. 4, the load transducer of one of the FIGS. 1 to 3 could be used just as effectively, or conversely.

In general, any load transducer may be used which is able to detect the deformation of the deformable parallelogram as a function of the load Q applied on the load-carrying plate. It should also be noted that the load receiver may work just as effectively under compression as under traction and that, therefore, it may have other uses than those of a balance used commercially.

The load receiver may, of course, be produced with different dimensions depending on the range of weights to be measured, such as from a few kilograms to one tonne and even more.

For certain uses, it is even possible to provide four double elastic hinges, each composed of two constrictions, instead of the four simple elastic hinges which have been specifically described.

We claim:

1. A load receiver comprising a fixed upright assembly including an arcuate section integral with a frame, a loaded upright assembly including an arcuate section integral with a load-carrying plate and two arcuate arms hinged onto the arcuate sections to form therewith a deformable parallelogram, the two arcuate sections and the two arcuate arms together forming a circular ring-shaped integral structure comprised between a circular internal profile and a circular external profile and provided with constrictions in the internal and/or external circular profile which define the hinges of the deformable parallelogram, and a load transducer provided to detect the deformation of the parallelogram under the effect of a load applied on the plate, at least some of the constrictions having in their flexion zone a neutral line, the slope of which is inclined to the horizontal.

2. A load receiver according to claim 1, wherein the slope of the neutral line of the constrictions is inclined to the horizontal by an angle $\alpha$ of between 30° and 60° and preferably equal to approximately 45°.

3. A load receiver according to claim 1, wherein the load transducer comprises a capacitor transducer formed by a first electrode mounted integrally with the fixed upright and by a second electrode mounted integrally with the loaded upright.

4. A load receiver according to claim 1, wherein the load transducer comprises four strain gauges, each being positioned on a respective constriction.

5. A load receiver according to claim 1, wherein the load transducer comprises four strain gauges, positioned in pairs on two constrictions having opposite strains.

6. A load receiver according to claim 1, wherein the integral structure is produced from an extrusion such as a tube.

7. A load receiver according to claim 6, wherein the extrusion is composed of a material which has elastic qualities, such as spring steel, beryllium bronze or alight alloy.

8. A load receiver according to claim 6 or 7, wherein the constrictions are produced by interior and/or exterior machining of the extrusion.

9. A load receiver according to claim 6 or 7, wherein the constrictions are produced by drawing out the extruded shape.

* * * * *